(12) United States Patent
Kaczyński et al.

(10) Patent No.: US 11,341,218 B2
(45) Date of Patent: May 24, 2022

(54) MESSAGING APPLICATION AND ELECTRONIC COMMUNICATIONS DEVICE PROVIDING MESSAGING INTERFACE FOR MESSAGING APPLICATION

(71) Applicant: V440 SPÓŁKA AKCYJNA, Warsaw (PL)

(72) Inventors: Kamil Kaczyński, Warsaw (PL); Michał Glet, Warsaw (PL)

(73) Assignee: V440 SPÓŁKA AKCYJNA, Warsaw (PL)

( * ) Notice: Subject to any disclaimer, the term of this patent is extended or adjusted under 35 U.S.C. 154(b) by 464 days.

(21) Appl. No.: 16/257,275

(22) Filed: Jan. 25, 2019

(65) Prior Publication Data

US 2020/0242219 A1   Jul. 30, 2020

(51) Int. Cl.
| | |
|---|---|
| *G06F 21/31* | (2013.01) |
| *H04L 51/046* | (2022.01) |
| *G06F 21/62* | (2013.01) |
| *H04L 51/42* | (2022.01) |
| *H04L 51/18* | (2022.01) |

(52) U.S. Cl.
CPC .......... *G06F 21/31* (2013.01); *G06F 21/6245* (2013.01); *H04L 51/046* (2013.01); *H04L 51/18* (2013.01); *H04L 51/22* (2013.01)

(58) Field of Classification Search
None
See application file for complete search history.

(56) References Cited

U.S. PATENT DOCUMENTS

| | | | | |
|---|---|---|---|---|
| 7,890,084 B1* | 2/2011 | Dudziak | ............... | H04L 63/045 |
| | | | | 455/411 |
| 7,984,482 B1* | 7/2011 | Cannata | .................. | G06F 16/27 |
| | | | | 726/2 |
| 8,362,901 B2* | 1/2013 | Jung | .................. | G08B 21/0272 |
| | | | | 340/568.1 |
| 9,286,482 B1* | 3/2016 | Dumont | .................. | G06F 21/32 |
| 9,807,597 B2* | 10/2017 | Yamada | .................. | H04M 1/57 |
| 10,121,023 B2* | 11/2018 | Akula | ................. | G06F 21/6245 |

(Continued)

FOREIGN PATENT DOCUMENTS

EP   2953321 A1   12/2015

OTHER PUBLICATIONS

European Patent Office, Extended European Search Report, Application No. 19020043.6, dated May 29, 2019, 8 pages.

*Primary Examiner* — Michael W Chao (74) *Attorney, Agent, or Firm* — Ziegler IP Law Group, LLC (57) ABSTRACT

A messaging application configured to provide a messaging interface on which outgoing messages from a user, to contacts can be composed and incoming messages from the contacts can be viewed. Moreover, the messaging application is configured to store message data in an encrypted form as a database file. Furthermore, the messaging application is configured to require the user to input a predetermined access code before giving access to the messaging interface. Moreover, the messaging application is configured to provide a first mode in which the user is given access to all message data when a first predetermined access code is input, and a second, secret mode in which the user is given access to only a subset of all the message data, when a second predetermined access code is input by the user.

23 Claims, 5 Drawing Sheets

(56) References Cited

U.S. PATENT DOCUMENTS

| | | | | |
|---|---|---|---|---|
| 10,417,447 B2* | 9/2019 | Tumuluru | | H04L 63/10 |
| 10,754,986 B2* | 8/2020 | Liggins | | H04L 51/12 |
| 10,885,165 B2* | 1/2021 | Zhan | | H04L 63/1425 |
| 11,194,462 B2* | 12/2021 | Ananthakrishnan | | H04W 12/06 |
| 2008/0020803 A1* | 1/2008 | Rios | | H04M 1/72448 455/565 |
| 2008/0051072 A1* | 2/2008 | Kraft | | H04M 1/2748 455/418 |
| 2009/0282473 A1* | 11/2009 | Karlson | | H04L 63/102 726/17 |
| 2010/0275032 A1 | 10/2010 | Bhangi | | |
| 2011/0321156 A1* | 12/2011 | Smith | | G06F 21/31 726/19 |
| 2012/0084734 A1* | 4/2012 | Wilairat | | G06F 21/629 715/863 |
| 2012/0115435 A1* | 5/2012 | Oren | | H04M 1/72448 455/410 |
| 2013/0007900 A1* | 1/2013 | Santhanu | | H04M 1/2745 726/30 |
| 2013/0145453 A1* | 6/2013 | Lemke | | G06F 21/629 726/16 |
| 2014/0047537 A1* | 2/2014 | McCann | | G06F 21/45 726/19 |
| 2014/0173747 A1* | 6/2014 | Govindaraju | | G06F 21/53 726/27 |
| 2014/0283128 A1* | 9/2014 | Shepherd | | G06F 21/629 726/28 |
| 2015/0089666 A1* | 3/2015 | Lee | | H04W 12/088 726/27 |
| 2015/0213242 A1* | 7/2015 | Taylor | | G06F 21/6245 726/18 |
| 2015/0350251 A1* | 12/2015 | Brander | | G06F 16/955 713/168 |
| 2016/0057093 A1* | 2/2016 | Seo | | H04L 51/22 715/752 |
| 2016/0283741 A1* | 9/2016 | Lin | | G06F 21/6245 |
| 2016/0292461 A1* | 10/2016 | Yan | | G06F 21/6218 |
| 2018/0024846 A1* | 1/2018 | Wu | | G06F 9/451 715/741 |
| 2018/0062846 A1* | 3/2018 | Li | | G06F 21/32 |
| 2018/0225478 A1* | 8/2018 | DeLuca | | G06F 21/6245 |
| 2018/0239915 A1* | 8/2018 | Wang | | G06F 21/62 |
| 2018/0302786 A1* | 10/2018 | Yu | | G06F 21/316 |
| 2018/0365443 A1* | 12/2018 | Bai | | H04W 12/02 |
| 2019/0306300 A1* | 10/2019 | Cohen | | G06F 21/629 |
| 2020/0125701 A1* | 4/2020 | Isaac | | G06F 21/31 |

* cited by examiner

FIG. 8

MESSAGING APPLICATION AND ELECTRONIC COMMUNICATIONS DEVICE PROVIDING MESSAGING INTERFACE FOR MESSAGING APPLICATION

TECHNICAL FIELD

The present disclosure relates generally to communication technologies; and more specifically, to messaging applications providing a confidential communication interface.

BACKGROUND

With an advancement in technology, digital communication systems such as phone calls and messaging services have gained immense importance. Considering fast-paced lifestyle of the users, the users nowadays prefer to communicate via instant messaging services such as messaging applications over communication via the phone calls. The messaging applications provide quick transfer of information shared by the user, such as a message, a voice recording, an image file and so forth. Moreover, such messaging applications supports services such as audio calls and video calls, enabling the user to communicate with other users registered on the messaging application.

Commonly, one of the problems faced by the user while using the messaging application is a security threat of the information shared by the user. The user requires concealment of personal information such as bank details, medical details, home address, personnel files and so forth shared by the user on the messaging application from a third-party such as to avoid any misuse of the personal information of the user by the third-party. Conventionally, the messaging applications allows the users to set a password, wherein the user is required to input the password before accessing a messaging interface of the messaging application. Such a password-enabled messaging interface provides security to the user until the user inputs the password. Once the user has input the password, the information is prone to a threat, such as in an instance, when another user gains access to the messaging interface.

Furthermore, work profile of users such as journalists, police officers and detectives generally involve contacting several sources that may provide them with useful information. Protecting identity of the sources is essential, such as to ensure life-safety of the sources. Moreover, safeguarding such useful information provided by the sources is one of a main concern encountered by the users. Notably, the useful information may be misused, tampered, copied or even deleted from the messaging application by the third-party, if the useful information reaches the third-party through the messaging application. Furthermore, the third-party may acquire screenshots of the useful information from the messaging application and maliciously share the screenshots amongst other users.

Therefore, in light of the foregoing discussion, there exists a need to overcome the aforementioned drawbacks associated with conventional messaging applications.

SUMMARY

The present disclosure seeks to provide a messaging application for a messaging service for an exchange of information between users. The present disclosure also seeks to provide an electronic communications device providing a messaging interface for an exchange of information between users. The present disclosure seeks to provide a solution to the existing problem of security threat of the information shared by the user in the messaging applications. An aim of the present disclosure is to provide a solution that overcomes at least partially the problems encountered in prior art, and provides a secure and a reliable messaging application, wherein the user is allowed to create multiple instances of secret chats within the secret chats. Such a messaging application ensures that message data in the messaging application is securely stored by the user without being misused by a third-party.

In one aspect, an embodiment of the present disclosure provides a messaging application for a messaging service for an electronic communications device including a data store, the messaging application being configured to:
provide a messaging interface on which outgoing messages from a user, having a registered identity on a messaging service, to one or more contacts can be composed and incoming messages from one or more contacts can be viewed;
store message data in an encrypted form as a database file on the electronic communications device;
require a user to input a predetermined access code before giving access to a messaging interface; and
provide two modes of operation:
a first mode in which a user is given access to all message data that are stored on an electronic communications device for a registered identity of a user, wherein a first mode of operation is entered in an event that a first predetermined access code is provided to obtain access to a messaging interface, and
a second, secret mode in which a user is given access to only a subset of all message data that are stored on an electronic communications device for a registered identity of a user, wherein a secret mode of operation is entered in an event that one of a group of second predetermined access codes is provided to obtain access to a messaging interface.

In another aspect, an embodiment of the present disclosure provides an electronic communications device including a data store and a processor, an electronic communications device having a messaging application for a messaging service, a processor being configured to execute a messaging application to:
provide a messaging interface on which outgoing messages from a user, having a registered identity on the messaging service, to one or more contacts can be composed and incoming messages from one or more contacts can be viewed;
store message data in an encrypted form as a database file in the data store on the electronic communications device;
require a user to input a predetermined access code before giving access to the messaging interface; and
provide two modes of operation:
a first mode, in which a user is given access to all message data that are stored on an electronic communications device for a registered identity of a user, wherein a first mode of operation is entered in an event that a first predetermined access code is provided to obtain access to a messaging interface; and
a second, secret mode in which a user is given access to only a subset of all message data that are stored on an electronic communications device for registered identity of a user, wherein a second mode of operation is entered in an event that one of a group of second predetermined access codes is provided to obtain access to a messaging interface.

Embodiments of the present disclosure substantially eliminate or at least partially address the aforementioned problems in the prior art, and enable a secure storage of the message data in the messaging application.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a messaging application for a messaging service for an electronic communications device including a data store, the messaging application being configured to:

provide a messaging interface on which outgoing messages from a user, having a registered identity on a messaging service, to one or more contacts can be composed and incoming messages from one or more contacts can be viewed;

store message data in an encrypted form as a database file on the electronic communications device;

require a user to input a predetermined access code before giving access to a messaging interface; and provide two modes of operation:

a first mode in which a user is given access to all message data that are stored on an electronic communications device for a registered identity of a user, wherein a first mode of operation is entered in an event that a first predetermined access code is provided to obtain access to a messaging interface, and a second, secret mode in which a user is given access to only a subset of all message data that are stored on an electronic communications device for a registered identity of a user, wherein a secret mode of operation is entered in an event that one of a group of second predetermined access codes is provided to obtain access to a messaging interface.

In another aspect, an embodiment of the present disclosure provides an electronic communications device including a data store and a processor, an electronic communications device having a messaging application for a messaging service, a processor being configured to execute a messaging application to:

provide a messaging interface on which outgoing messages from a user, having a registered identity on the messaging service, to one or more contacts can be composed and incoming messages from one or more contacts can be viewed;

store message data in an encrypted form as a database file in the data store on the electronic communications device;

require a user to input a predetermined access code before giving access to the messaging interface; and provide two modes of operation:

a first mode, in which a user is given access to all message data that are stored on an electronic communications device for a registered identity of a user, wherein a first mode of operation is entered in an event that a first predetermined access code is provided to obtain access to a messaging interface; and a second, secret mode in which a user is given access to only a subset of all message data that are stored on an electronic communications device for registered identity of a user, wherein a second mode of operation is entered in an event that one of a group of second predetermined access codes is provided to obtain access to a messaging interface.

Throughout the present disclosure, the term "messaging application" relates to a platform that enables exchange of messages between one or more users. Generally, the exchange of messages may be between a sender and a receiver, or the exchange of messages may be between a sender and more than one receiver (such as in a group of users created on the messaging application). Moreover, the messages may be broadcast on the platform, wherein the more than one receiver receives the message shared by the sender, and wherein the more than one receiver are not a part of a single group created on the platform. It will be appreciated that the messaging application allows the exchange of messages between a plurality of senders and a plurality of receivers. Furthermore, the messages may be exchanged in a form of a written text, an audio file, an image file, a voice call, a video call and so forth.

Throughout the present disclosure, the term "user" as used herein relates to any entity including a person (i.e., human being) or a virtual personal assistant (an autonomous program or a bot) using an electronic communications device as described herein.

Throughout the present disclosure, the term "electronic communications device" relates to an electronic device associated with (or used by) the user that is capable of enabling the user to perform specific tasks associated with the aforementioned messaging application. Furthermore, the electronic communications device is intended to be broadly interpreted to include any electronic device that may be used for voice and/or data communication over a wireless communication network. Examples of electronic communications device include, but are not limited to, cellular phones, personal digital assistants (PDAs), handheld devices, wireless modems, laptop computers, personal computers, etc. Moreover, electronic communications device may alternatively be referred to as a mobile station, a mobile terminal, a subscriber station, a remote station, a user terminal, a terminal, a subscriber unit, an access terminal, etc. Additionally, the electronic communications device includes a casing, a data store, a processor, a network interface card, a microphone, a speaker, a keypad, and a display. Moreover, the electronic communications device is to be construed broadly, so as to encompass a variety of different types of mobile stations, subscriber stations or, more generally, communication devices, including examples such as a combination of a data card inserted in a laptop. Such communication devices are also intended to encompass devices commonly referred to as "access terminals".

Throughout the present disclosure, the term "data store" as used herein relates to an organized body of digital information regardless of the manner in which the data or the organized body thereof is represented. Optionally, the data store may be hardware, software, firmware and/or any combination thereof. For example, the organized body of related data may be in the form of a table, a map, a grid, a packet, a datagram, a file, a document, a list or in any other form. The data store includes any data storage software and systems, such as, for example, a relational database like IBM DB2 and Oracle 9. Furthermore, the data store refers to the software program for creating and managing one or more data stores. Optionally, the data store may be operable to support relational operations, regardless of whether it enforces strict adherence to the relational model, as understood by those of ordinary skill in the art. Additionally, the data store may be populated by data elements. Furthermore, the data elements may include data records, bits of data, cells, are used interchangeably herein and all intended to mean information stored in cells of a database.

Throughout the present disclosure, the term "processor" as used herein relates to programmable and/or non-programmable components configured to execute one or more software application (such as the messaging application) for storing, processing and/or sharing data and/or set of instructions. Optionally, the processor may include, for example, a component included within an electronic communications network. Additionally, the processor includes one or more data processing facilities for storing, processing and/or sharing data and/or set of instructions. Furthermore, the processor includes hardware, software, firmware or a combination of these, suitable for storing and processing various information and services accessed by the one or more user using the electronic communications device. Optionally, processor include functional components, for example, a memory, a network adapter and so forth.

Throughout the present disclosure, the term "messaging interface" relates to a structured set of user interface elements rendered on a display screen. Optionally, the messaging interface rendered on the display screen is generated by any collection or set of instructions executable by an associated digital system. Additionally, the messaging interface is operable to interact with the user to convey graphical and/or textual information and receive input from the user. Furthermore, the messaging interface elements refer to visual objects that have a size and position in messaging interface. A messaging interface element may be visible, though there may be times when a messaging interface element is hidden. Text blocks, labels, text boxes, list boxes, lines, and images windows, dialog boxes, frames, panels, menus, buttons, icons, etc. are examples of messaging interface elements. In addition to size and position, a messaging interface element may have other properties, such as a margin, spacing, or the like.

Throughout the present disclosure, the term "predetermined access code" relates to a unique code required for an authentication of the user using the messaging application on the electronic communications device. The user may be required to input the predetermined access code at more than one stage of accessing the messaging application. Generally, the predetermined access code is to be set by the user, and the user is generally required not to share the predetermined access code with any other user to avoid any misuse of registered identity of the user on the messaging application. Optionally, the predetermined access code may be a string of characters such as alphabetic characters, numbers, special characters or a combination thereof. In an example, the predetermined access code may be 'ABC@123', 'XYZ11', 'qwerty12' and so forth. More optionally, the predetermined access code may be in the form of gestures made by the user, patterns of touch generated by the user and so forth.

Throughout the present disclosure, the term "push notification" relates to a message displayed on the electronic communications device without any special request made by the user. In an example, the push notification displays a message notifying the user about a received message, a message failed to send, system updates and so forth. In another example, a push notification can be pop-up window that may be displayed in the screen of electronic communications device as a result of an instant reply to a message received on the electronic communications device.

The present disclosure provides the messaging application for the messaging service for the electronic communications device including the data store and the processor, the messaging application being configured to provide the messaging interface on which outgoing messages from the user, having the registered identity on the messaging service, to one or more contacts can be composed and incoming messages from one or more contacts can be viewed. The user is required to install the messaging application on the electronic communications device, unless it is preinstalled on the device, to utilize the messaging service in order to create, send and receive messages via the messaging interface. Furthermore, the installed messaging application provides the user with the messaging interface on which the user creates the registered identity (such as a user account) to obtain a separate user account only accessible by the user on the messaging interface. The registered identity of the user on the messaging interface enables the user to exchange messages between other users who have a registered identity on the messaging interface. Furthermore, the user may compose messages on the messaging interface for one or more contacts displayed on the messaging interface. Notably, the one or more contacts displayed on the messaging interface are of other users registered on the messaging application. The user may send the composed messages to one or more contacts using the messaging interface. Moreover, the messaging interface allows the user to receive messages from the other users displayed on the messaging interface. The user may forward the received messages to other contacts on the messaging interface. In an example, a user named Paul Thomas creates a registered identity on the messaging service. The user enters a username field while registering on the messaging service as 'PaulThomas123'. Therefore, the user will be identified on the messaging application by its username i.e. 'PaulThomas123'. Therefore, for using the messaging service, the user Paul Thomas accesses the messaging application by the username 'PaulThomas123'.

Furthermore, the messaging application is configured to store message data in an encrypted form as the database file on the electronic communications device. The messages sent by the user and the messages received by the user on the messaging application are encrypted in order to avoid any unauthorized access of the exchanged messages as they pass over networks (wireless and/or cabled). Moreover, the encrypted messages are stored as the database file in the data store on the electronic communications device. Additionally, the database file stored in the data store acts as a backup, wherein in case of loss of messages from the messaging application, the messages may be retrieved from the data store on the electronic communications device.

Furthermore, the messaging application is configured to require the user to input a predetermined access code before giving access to the messaging interface. The user while registering on the messaging service is required to set a predetermined access code on the messaging interface. The user is subsequently required to input the predetermined access code in order to access the messaging interface. Referring to the abovementioned example, the user Paul Thomas registers as 'PaulThomas123' on the messaging application. Moreover, the user is required to set a predetermined access code for its registered identity. Suppose the user sets the predetermined access code as 'ABC@123'. Therefore, for accessing the messaging interface, the user enters the predetermined access code as 'ABC@123'. Moreover, the user is required to enter both the username 'PaulThomas123' and the predetermined access code 'ABC@123' for accessing the messaging interface, once the user has logged out of the messaging application.

In an embodiment, the messaging application is configured to accept the predetermined access codes in the form of gestures captured by an image capture module of the electronic communications device, or patterns of touch captured by a touch-sensitive interface of the electronic communications device. Furthermore, the gestures refer to inputs and/or interactions that are provided by the user in a tactile manner, such as through physical interaction with one or more media, elements, and/or components included in the electronic communications device. Optionally, the image capturing module can be used to capture an image of the user to determine a gesture performed by the user.

The image capturing module of the messaging application refers to a collection of one or more programmable and/or non-programmable components that are configured to capture one or more images of the user. Furthermore, the programmable component of the image capturing module relates to a device that includes at least one lens and image sensor to acquire a reflectance from a reflected visible light that is reflected from the surface, for example a face of the user. Optionally, the programmable component of the image capturing module includes a body housing, an electronic circuit, a photographic objective mounted on the body, and a connecting device operatively coupled to the electronic circuit. Furthermore, the programmable component of the image capturing module is operable to capture at least one image of the face of the user via the photographic objective and thereafter store the captured image in a storage component included in the electronic circuit. Optionally, the programmable component of the image capturing module can be a smartphone camera. Specifically, the programmable component of the image capturing module is a built-in camera within the electronic communications device. Furthermore, the electronic communications device can include physical and virtual element, namely a button that enables capturing images of the user (such as the face of the user).

The image captured by the image capturing module can indicate various facial gestures therein. For example, an image of the face of the user with raised eyebrows. In such instance, the raised eyebrows may be considered as a gesture of the user. In such instance, the image of the user captured by the image capturing module having raised eyebrows may be considered as the predetermined access codes.

Alternatively, the gestures can be collected by identifying patterns of touch captured by the touch-sensitive interface of the electronic communications device. The touch-sensitive interface refers to an interface comprising a sensor electrode arrangement configured to receive one or more body-coupled communication signals via a user part touching or approaching the interface, and a detector configured to detect a position of the user part, or other information such as a code, based on the one or more body-coupled communication signals. Furthermore, the sensor electrode arrangement may be a capacitive sensing arrangement incorporated inside the interface, allowing a contact-free sensing and a protection of the sensing components. In an example, the touch-sensitive interface may be a screen of the electronic communications device, a touch pad associated with the electronic communications device. In such an instance, a pattern may be made by the user on the screen or the touch pad of the electronic communications device, such pattern may be captured by the sensor electrode arrangement and determined as a pattern. Subsequently, the determined pattern may be accepted as the predetermined access code from the user.

Furthermore, the messaging application is configured to provide two modes of operation, wherein in the first mode, the user is given access to all the message data that are stored on the electronic communications device for the registered identity of the user, and wherein the first mode of operation is entered in the event that a first predetermined access code is provided to obtain access to the messaging interface; and wherein in the second mode i.e. the secret mode, the user is given access to only a subset of all the message data that are stored on the electronic communications device for the registered identity of the user, and wherein the second mode of operation is entered in the event that one of a group of second predetermined access codes is provided to obtain access to the messaging interface. The user is thus provided with two modes of operation for utilizing the message service.

In the first mode of operation, which may be termed the full access mode, the user has access to the message data from all the contacts that are stored on the electronic communications device for the registered identity of the user. The user is required to set the first predetermined access code in order to access the message data during the first mode of operation. Therefore, each time the user requires to access the messaging application in the first mode, the user needs to input the first predetermined access code. Subsequently, the user gains access to the messaging interface, wherein all the message data that are stored on the electronic communications device are available through or displayed on the messaging interface.

In the second mode of operation i.e. the secret mode, the user has access to only a subset of all the message data that are stored on the electronic communications device for the registered identity of the user—in essence, the user can designate a particular contact or contacts as secret contacts whose existence is concealed within that instance and in any subordinate instances (i.e. those lower in the hierarchy, created as instances within that instance or within descendent instances). There may be multiple secret chat instances, and for each of these a distinct access code or password is required. The user is required to set a second predetermined access code in order to create or access a secret chat. In secret modes, only a subset of all the message data that are stored on the electronic communications device is available. Therefore, for each time the user requires to access the messaging application in the secret mode, in which one or more contacts are concealed, the user needs to input the appropriate second predetermined access code. Subsequently, the user gains access to the messaging interface, wherein only the subset of all the message data corresponding to the entered second predetermined access code that are stored on the electronic communications device are available through or displayed on the messaging interface. Moreover, the user may create multiple secret chat sessions within the second mode of operation, and for creating and accessing each of the secret chat sessions, the user needs to set a specific second predetermined access code.

In an embodiment, the group of second predetermined access codes consists of a single second predetermined access code. In an instance when the user requires a single secret chat session in which contacts designated as secret are concealed but in which other contacts, not designated as the secret contacts, can be messaged and contacted as usual, the user may create a single second predetermined access code to access such a secret chat session. Therefore, the user requires one first predetermined access code to access the message data associated with all the contacts and one second predetermined access code to be able to use the messaging application with only the contacts not designated as the secret contacts, and to be able to see the message data associated with those contacts, while supressing contacts designated as secret as well as hiding the message data associated with those secret contacts.

In the secret mode of operation the messaging application provides, as a default condition (which the user may subsequently choose to override), that no push notifications of messages are displayed for any contact designated as secret, and no incoming calls are received from any contact designated as secret contact. The user may designate one or more contacts as a secret contact, and message data associated with the secret contact(s) is not displayed in the secret mode of operation on the messaging interface. Therefore, if the user intends to hide the message data associated with the one or more contacts, the user designates the one or more contacts as a secret contact. Moreover, once the one or more contacts has been designated as a secret contact, no push notifications are displayed for the secret contacts on the messaging interface in the secret mode of operation.

The processor may be configured, in any given instance of the secret mode, to provide the user with access to messages exchanged with contacts, other than secret contacts, in the particular instance of the mode (first or secret) in which the given instance was created. The user is provided access to all the message data exchanged with all contacts, including those contacts designated as the secret contacts (i.e. whose contact details and chats only appear in a secret mode) in the first, full access, mode of operation. Whereas in the second mode of operation, the user is provided with access only to the message data exchanged with the contacts that are not designated as the secret contacts. In an example, the user 'Paul Thomas' accesses the messaging application, in which the user has 6 contacts for the registered identity on the messaging application. In such an instance, the user may exchange messages between the 6 contacts using the messaging interface. Suppose the user then designates 2 contacts as secret contacts, out of the 6 contacts. Moreover, the user sets a first predetermined access code as 'ABC@123' and a second predetermined access code as 'XYZ@123'. In order to access the message data in the first mode of operation, the user is required to input the first predetermined access code as 'ABC@123'. Once the user has input the first predetermined access code as 'ABC@123', the user gains access to all the message data associated with the 6 contacts. In such an instance, the push notifications associated with the message data of the secret contacts are also displayed on the messaging interface. Whereas, in order to access the message data in the secret mode of operation, the user is required to input the second predetermined access code as 'XYZ@123'. Once the user has input the second predetermined access code as 'XYZ@123', the user gains access to only the 4 contacts that has not been designated as the secret contacts. In such an instance, the push notifications associated with the message data of the secret contacts are not displayed on the messaging interface.

In an embodiment, the messaging application supports incoming calls from contacts, and designating one of the one or more contacts as the secret contact has the effect that no incoming calls are supported for any contact designated as the secret contact. In the secret mode of operation, no incoming calls are supported for the contacts designated as secret contacts. The user when operating the messaging application in the secret mode, will only receive incoming calls from the contacts other than the secret contacts. On the other hand, during the first mode of operation, the user may receive incoming calls from any of the contacts that are stored on the electronic communications device for the registered identity of the user.

In an embodiment, the messaging application supports outgoing calls to contacts designated as the secret contacts, but withholds call details of such outgoing calls from any call log feature of an operating system of the electronic communications device, so that such outgoing calls do not appear in any call log on the electronic communications device. Throughout the present disclosure, the term "operating system" relates to a software related system configured to execute application programs (such as the messaging application) and interface between the application programs and associated hardware (such as a display, the processor, a memory, sensors and so forth). Specifically, the operating system may be a computing platform in which a plurality of computer programs may be installed. More specifically, the operating system may be operable to perform message data related functions such as receiving of the messages, sending of the messages, and so forth. Optionally, the operating system defined herein may include a firmware that may be executed by a single and/or a plurality of processors. In such a case, the term 'firmware' used herein relates to the processor routines that are stored in non-volatile memory structures such as read only memories (ROMs), flash memories, and so forth. Furthermore, the operating system may interact with the firmware for providing the computing platform in which the plurality of computer programs may be installed and executed. In an example, the operating system may be executed within the electronic communications device. Moreover, the operating system is operable to perform other electronic communications device related applications such as managing phone calls on the electronic communications device, accessing web-based content on the electronic communications device and so forth. The messaging application allows outgoing calls to all the contacts including the secret contacts, but the call related information of the secret contacts is not stored and displayed in the call log of the electronic communications device. In such an instance, the user is able to withhold any information related to the call data of the secret contacts, if the call to the secret contact has been made through the messaging application.

In an embodiment, the messaging application supports multiple instances of the secret mode, each invoked with its own predetermined access code from the group of second predetermined access codes. The messaging application allows the user to create multiple instances of the secret mode, with each instance of the secret mode optionally having different contact(s) designated as secret contact(s). The user may access an instance of the secret mode by inputting the second predetermined access code corresponding to the relevant instance of the secret mode. In an example, the user operates 2 secret modes in the messaging application. In a first instance of the secret mode, the user has 2 contacts designated as the secret contact, namely, 'Tim' and 'George'. The second predetermined access code for the first instance of the secret mode is 'PQR12'. In a second instance of the secret mode, the user has 1 contact designated as secret contact, namely, 'Maria'. The second predetermined access code for the second instance of the secret mode is 'XYZ12'. Therefore, if the user inputs the second predetermined access code as 'PQR12', the message data associated with the secret contacts 'Tim' and 'George' are not displayed on the messaging interface. Moreover, if the user inputs the second predetermined access code as 'XYZ12', the message data associated with the secret contact 'Maria' are not displayed on the messaging interface, but the message data associated with the contacts 'Tim' and 'George' are displayed on the messaging interface (unless the second instance of the secret mode was created in the first instance of the secret mode—in which case, the message data for all of Tim, George and Maria would be supressed and not displayed on the messaging interface).

In an embodiment, the application is configured to provide an option for the user to create another instance of the secret mode, with its own predetermined access code, from within either the first mode or an instance of the secret mode. Another instance of the secret mode may be created by the user from within the first mode of operation. Alternatively, another instance of the secret mode may be created by the user from within a previous instance of the secret mode. In other words, the user may access the messaging interface using the first mode of operation, and then create another instance of the secret mode within the first mode. Furthermore, the user may access the messaging interface using the secret mode of operation, and then create another instance of the secret mode within the secret mode of operation. It will be appreciated that the messaging application allows a creation of multiple such instances of secret mode within the first mode of operation and the secret mode of operation.

In an embodiment, the first mode and all the instances of the secret mode form a hierarchy with the first mode at the head of the hierarchy. The user is allowed to create multiple instances of the secret modes, such that each of the secret mode forms the hierarchy with the first mode. The first mode displays all the contacts on the messaging interface that are stored on the electronic communications device for the registered identity of the user. The secret mode displays only the contacts not designated as secret contacts on the messaging interface, thereby forming the hierarchy with the first mode of operation. Furthermore, if a second instance of the secret mode is created within a first instance of the secret mode, the second instance of the secret mode comprises only contacts not designated as secret contacts in either the first secret mode or the second instance of the secret mode, thereby forming the hierarchy with the first secret mode. In an example, the messaging application comprises 10 contacts. The user has created a first secret mode, wherein the user has designated a contact as a secret contact named 'John'. Therefore, if the user accesses the first secret mode, the user is displayed 9 contacts excluding the secret contact 'John'. Moreover, the user has created a second instance of the secret mode within the first secret mode, the user having designated a contact as a secret contact named 'Lewis'. Therefore, if the user accesses the second instance of the secret mode, the user is displayed 8 contacts excluding the secret contacts 'John' and 'Lewis'.

In an embodiment, each particular instance of the secret mode provides the user with access to messages exchanged with contacts, other than secret contacts, in the first mode and all instances of the secret mode between the particular instance of the secret mode and the first mode in the hierarchy. The user gains access to all the message data in the first mode, whereas in any instance of the secret mode, the user gains access to the message data of all the contacts other than the contacts designated as the secret contacts. Referring to the abovementioned example, the user gains access to the message data related to all the 10 contacts in the messaging application in the first mode. Furthermore, the user gains access to the message data related to 9 contacts except for the secret contact 'John' in the first secret mode. Moreover, the user gains access to the message data related to 8 contacts except for the secret contacts 'John' and 'Lewis' in the second secret mode.

In an embodiment, the application is configured in the first mode to provide the user with access to all messages exchanged with all contacts in both the first mode and all instances of the secret mode. The user is allowed to access all the message data related to all the contacts that are stored on the electronic communications device for the registered identity of the user in the first mode. The message data comprise incoming messages, outgoing messages, incoming calls, outgoing calls, push notifications and so forth. It will be appreciated that the message data related to the secret contacts is also accessible to the user in the first mode of operation.

In an embodiment, the messaging application is configured to require the user to input a predetermined access code before giving the user access to the stored message data; and to delete the database file containing the encrypted data in the event that the predetermined code other than the first or the second predetermined access code is provided in place of the first or the second predetermined access code. The user is required to provide a predetermined access code to access the messaging interface of both the first mode and the secret mode. The user is denied a permission to access the messaging interface if the user is unable to input the first predetermined access code (to operate the first mode) or the second predetermined access code (to operate the secret mode). Moreover, the messaging application is configured to delete the database files comprising the encrypted data, if a pre-selected access code, other than the predetermined access code, is inputted by the user, in order to prevent any unauthorized usage of the message data.

Throughout the present disclosure, the term 'server' relates to a structure and/or module that include programmable and/or non-programmable components configured to store, process and/or share information. Optionally, the server includes any arrangement of physical or virtual computational entities capable of enhancing information to perform various computational tasks. Furthermore, it should be appreciated that the server may be both single hardware server and/or plurality of hardware servers operating in a parallel or distributed architecture. In embodiments, the server may be accessed over the Internet or an intranet. The server may be a virtual or cloud server. In an example, the server may include components such as memory, a processor, a network adapter and the like, to store, process and/or share information with other computing components, such as the electronic communications device. Optionally, the server is implemented as a computer program that provides various services (such as database service) to other devices, modules or apparatus.

In an embodiment, the messaging application is further configured, in the event that a predetermined code other than the first or the second predetermined access code is provided in place of the first or the second predetermined access code, to send a communication to a server administering the messaging service to unregister the registered identity from the messaging service so that the messaging service will subsequently not transmit notifications of the incoming calls or the messages made to that registered identity. The messaging application is configured to unregister the registered identity from the messaging service, if a pre-selected access code, other than the predetermined access code, is inputted, such as to prevent any unauthorized usage of the message data by any other user. Once the registered identity of the user has been unregistered, the user is not allowed to access the messaging application any further. Such a messaging application provides secure and reliable messaging service to the registered users of the messaging application.

For example, in case, the user enters a predetermined panic code, the processer is configured to delete all the database files related to the messaging application, and further unregisters the registered identity of the user. Notably, the predetermined panic code is input by the user at an instance, when the user intends to delete the database files and intends to unregister its identity from the messaging application intentionally, such as when the user suspects a possible misuse of the message data at hands of another user.

Further, in case, the user enters one or more wrong codes consecutively for a number of count exceeding a threshold count, the processor is configured to unregister the registered identity of the user. Notably, the wrong code may be any code other than the predetermined first access code, the predetermined second access code, and the predetermined panic code. However, if the number of count of the entered wrong codes is less than or equal to the threshold count, the processor is configured to accept another code from the user.

The present disclosure also relates to the electronics communication device as described above. Various embodiments and variants disclosed above apply mutatis mutandis to the electronics communication device.

In an embodiment, the processor while executing the application is configured to provide an option to enable the user to designate any one of the one or more contacts as the secret contact, with the effect that no push notifications of messages are displayed, and no incoming calls supported, for any contact designated as the secret contact.

In an embodiment, the processor supports incoming calls from contacts, and designating one of the one or more contacts as the secret contact has the effect that when executing the application, the processor is configured not to support incoming calls for any contact designated as the secret contact.

In an embodiment, the processor when executing the messaging application is configured to support outgoing calls to contacts designated as the secret contacts, but to withhold call details from any call log feature of the operating system of the electronic communications device so that such outgoing calls do not appear in any call log on the electronic communications device.

In an embodiment, the processor when executing the messaging application is configured to support multiple instances of the secret mode, each invoked with its own predetermined access code from the group of second predetermined access codes.

In an embodiment, the processor when executing the messaging application is configured to provide the option for the user to create another instance of the secret mode, with its own predetermined access code, from within either the first mode or the instance of the secret mode.

In an embodiment, the processor when executing the messaging application, in any given instance of the secret mode, is configured to provide the user with access to messages exchanged with contacts, other than secret contacts, in the instance of the secret mode or the first mode in which the given instance was created.

In an embodiment, the first mode and all the instances of the secret mode form the hierarchy with the first mode at the head of the hierarchy.

In an embodiment, the processor when executing the messaging application is configured in each particular instance of the secret mode to provide the user with access to messages exchanged with contacts, other than secret contacts, in the first mode and all instances of the secret mode between the particular instance of the secret mode and the first mode in the hierarchy.

In an embodiment, the processor when executing the messaging application is configured in the first mode to provide the user with access to all messages exchanged with all contacts in both the first mode and all instances of the secret mode.

In an embodiment, the processor when executing the messaging application is configured to require the user to input a predetermined access code before giving the user access to the stored message data and to delete the database file containing the encrypted data in the event that a predetermined access code other than the first or the second predetermined access code is provided in place of the first or the second predetermined access code.

In an embodiment, the processor when executing the messaging application is configured, in the event that the predetermined access code other than the first or the second predetermined access code is provided in place of the first or the second predetermined access code, to send the communication to the server administering the messaging service to unregister the registered identity from the messaging service so that the messaging service will subsequently not transmit notifications of incoming calls or messages made to that registered identity.

In an embodiment, the processor when executing the messaging application is configured to accept the predetermined access codes in the form of gestures captured by the image capture module of the electronic communications device, or patterns of touch captured by a touch-sensitive interface of the electronic communications device.

DETAILED DESCRIPTION OF THE DRAWINGS

Figure 1:
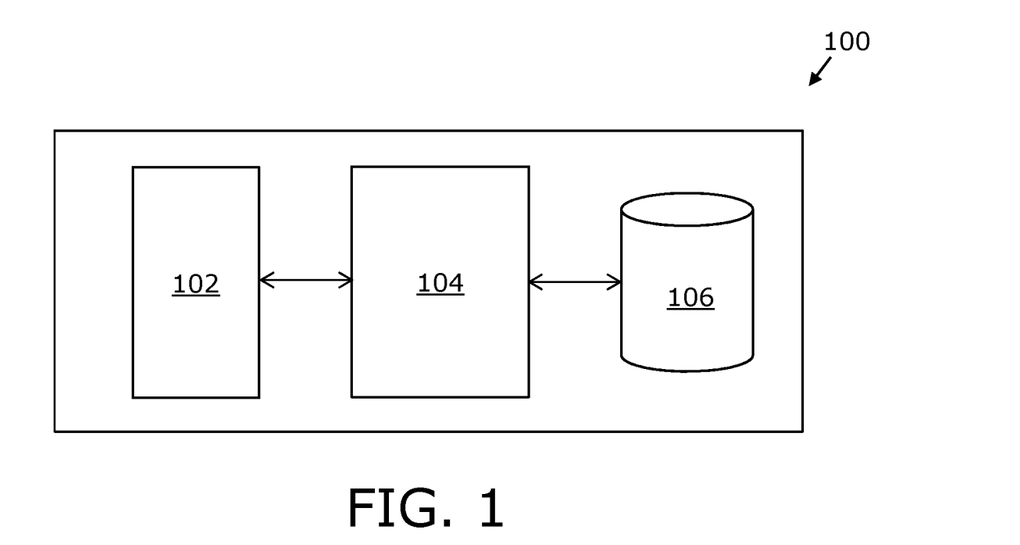
FIG. 1 is an illustration of a block diagram of an electronic communications device, in accordance with an embodiment of the present disclosure.

Referring to FIG. 1, illustrated is a block diagram of an electronic communications device 100, in accordance with an embodiment of the present disclosure. The electronic communications device 100 comprises a messaging interface 102, a processor 104 and a data store 106. Moreover, the processor 104 is communicatively coupled to the messaging interface 102 and the data store 106. The messaging interface 102 is provided for an interaction of a user (not shown) with the messaging application to utilize a messaging service.

Figure 2:
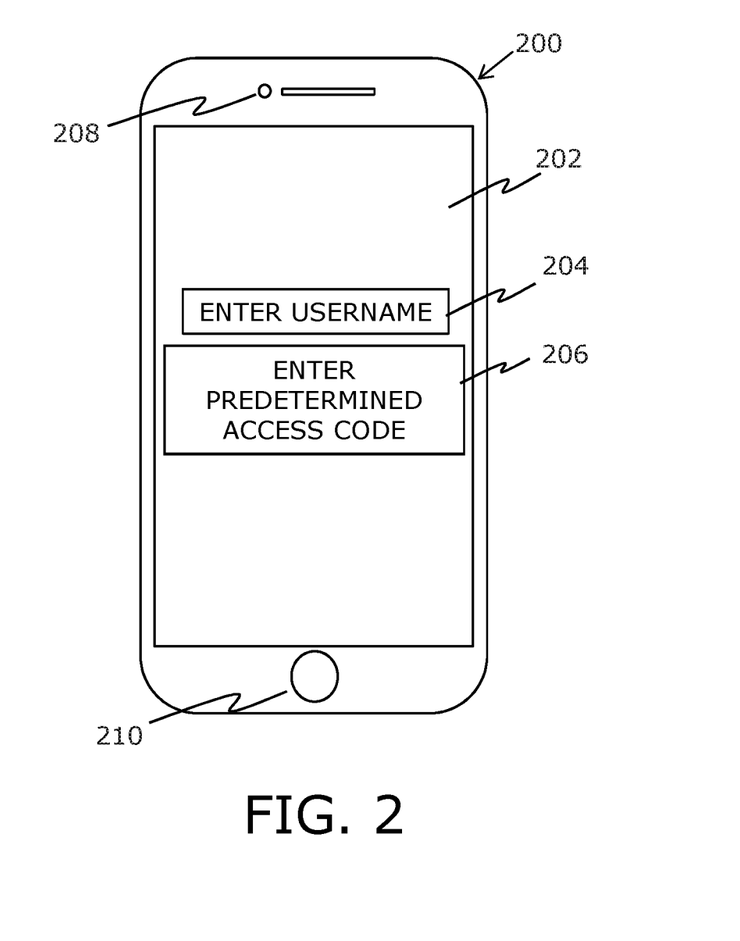
FIG. 2 is an illustration of a messaging interface displaying a request made to a user to input a username and a password, in accordance with an embodiment of the present disclosure.

Referring to FIG. 2, illustrated is a messaging interface 202 displaying a request made to a user to input a username and a password, in accordance with an embodiment of the present disclosure. As shown, the messaging interface is displayed on a screen, which may be a touch-sensitive screen, of an electronic communications device 200 (such as the electronic communications device 100 of FIG. 1). The user is required to input a username against an input field requesting the username 204, and a predetermined access code against an input field requesting the predetermined access code 206 to access the first mode or the second mode of operation. Notably, if the user inputs a first predetermined access code against an input field requesting the predetermined access code 206, the user gains access to the first, full access, mode of operation. Whereas, if the user inputs a second predetermined access code against the input field requesting the predetermined access code 206, the user gains access to the second, secret, mode of operation. Furthermore, there is shown an image capturing module 208 and a touch-sensitive interface 210 of the electronic communications device 200.

Figure 3:
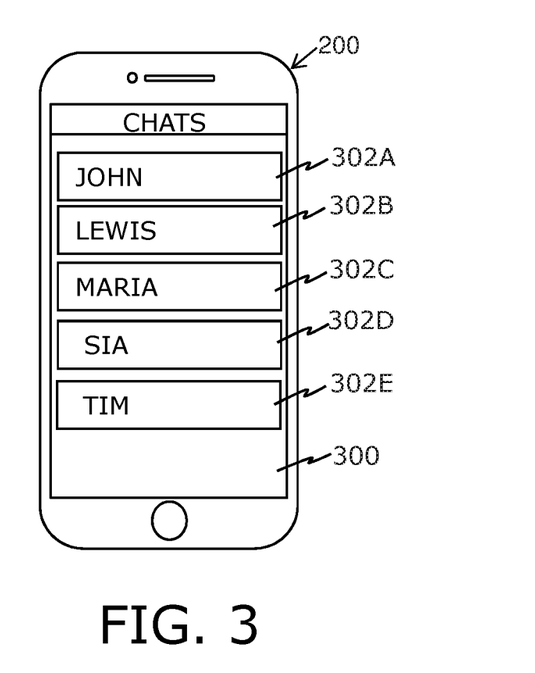
FIG. 3 is an illustration of a messaging interface displaying a first mode of a messaging application, in accordance with an embodiment of the present disclosure.

Referring to FIG. 3, illustrated is a messaging interface 300 displaying a first mode of a messaging application, in accordance with an embodiment of the present disclosure. As shown, the messaging interface 300 illustrates the first mode of operation, in which no contact has been marked as a secret contact. Moreover, in the first mode of operation, the messaging interface 300 shows fields corresponding to all contacts 302A, 302B, 302C, 302D and 302E, wherein the fields correspond to users 'John' 302A, 'Lewis' 302B, 'Maria' 302C, 'Sia' 302D and 'Tim' 302E.

Figure 4:
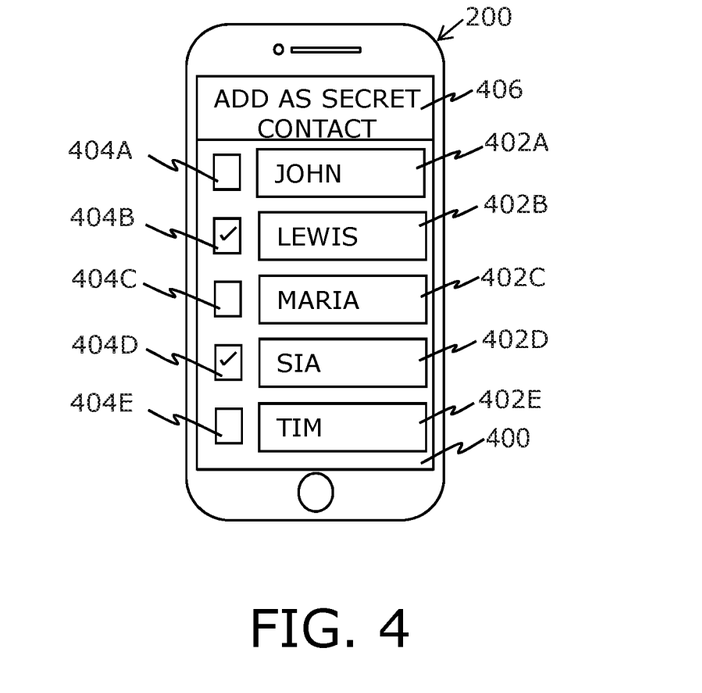
FIG. 4 is an illustration of a messaging interface displaying contacts being designated as secret contacts, in accordance with an embodiment of the present disclosure.

Referring to FIG. 4, illustrated is a messaging interface 400 displaying contacts being designated as secret contacts, in accordance with an embodiment of the present disclosure. As shown, checkboxes 404A, 404B, 404C, 404D and 404E appear against each field corresponding to the contacts 402A, 402B, 402C, 402D and 402E respectively for the user to select the contacts that the user intends to designate as the secret contacts. Moreover, a button 406 showing text written 'Add as secret contact' is displayed to the user. The user, for example, selects the fields corresponding to the contacts 'Lewis' 402B and 'Sia' 402D and presses the button 406 in order to designate these two contacts as the secret contacts.

Figure 5:
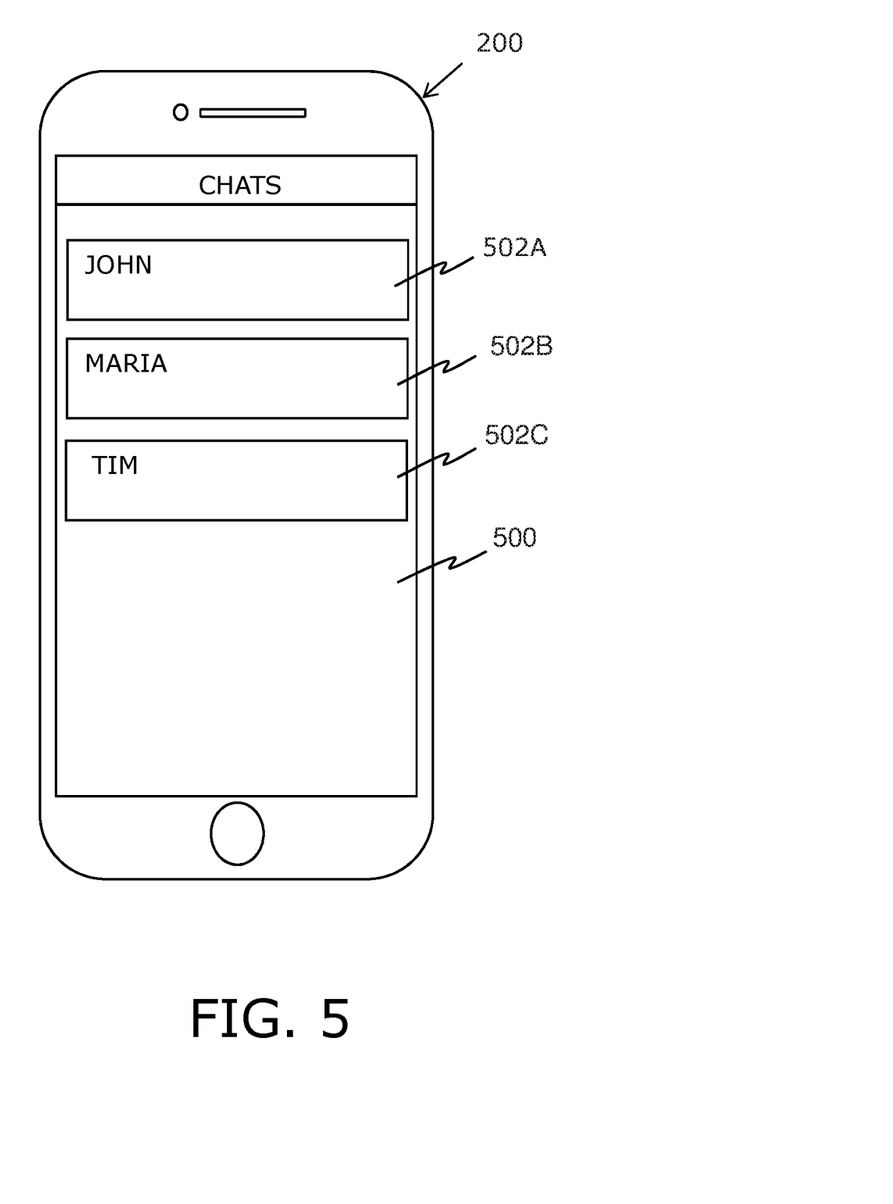
FIG. 5 is an illustration of a messaging interface displaying a secret mode of a messaging application.

Referring to FIG. 5, illustrated is a messaging interface 500 displaying a secret mode of a messaging application. As shown, the messaging interface 500 displays only the contacts that are not designated as the secret contacts in the second mode of operation, i.e. the fields corresponding to the contacts 'John' 502A, 'Maria' 502B, and 'Tim' 502C. The fields corresponding to the designated secret contacts 'Lewis' and 'Sia' (i.e. the contacts designated as the secret contacts 402B and 402D as shown in FIG. 4) have not been displayed in the messaging interface 500. It will be appreciated that the messaging interface 300 of the first mode (such as the messaging interface 300 shown in FIG. 3) and the messaging interface 500 of the secret mode are identical, except that the secret contacts are not displayed in the messaging interface 500 in the secret mode.

Figure 6:
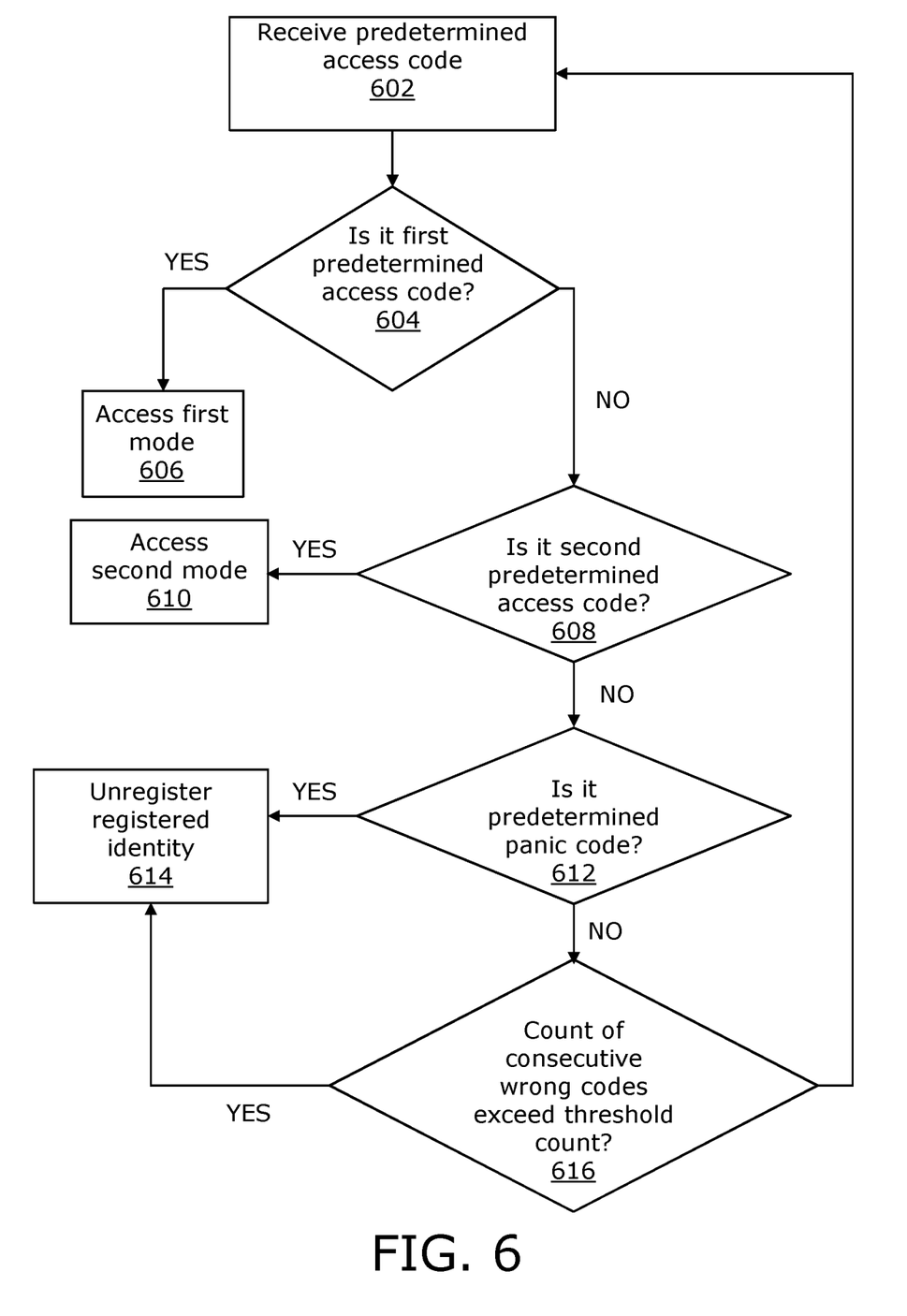
FIG. 6 is an illustration of a flow chart of a process performed by a processor of electronic communications device, in accordance with an embodiment of the present disclosure.

Referring to FIG. 6, illustrated is a flow chart of a process 600 performed by a processor of electronic communications device, in accordance with an embodiment of the present disclosure. The processor (such as the processor 104 shown in FIG. 1) is configured to execute the messaging application to provide the messaging interface, such that at a step 602, the messaging interface receives a predetermined access code from the user. Moreover, at a step 604, the processor is configured to determine if the received predetermined access code is a first predetermined access code. Furthermore, at a step 606, the processor is configured to provide access to a first mode to the user if the received predetermined access code is the first predetermined access code. Moreover, at a step 608, the processor is configured to determine if the received predetermined access code is a second predetermined access code. Furthermore, at a step 610, the processor is configured to provide access to a secret mode to the user if the received predetermined access code is the second predetermined access code. Moreover, at a step 612, the processor is configured to determine if the received code is a predetermined panic code. Furthermore, at a step 614, the processor is configured to unregister the registered identity of the user, if the received predetermined access code is the predetermined panic code. Moreover, if any other code, i.e. a wrong code is input by the user, the processor is configured to check if number of consecutive attempts of inputting one or more wrong codes exceeds a threshold count at a step 616. Furthermore, if the user enters one or more wrong codes consecutively for a number of count exceeding a threshold count, the processor unregisters the registered identity of the user (i.e., the process 600 goes to the step 614). However, if number of attempts of inputting the wrong codes consecutively by the user does not exceed the threshold count, the processor allows the user to input a code again (i.e., the process 600 returns to the step 602).

Figure 7:
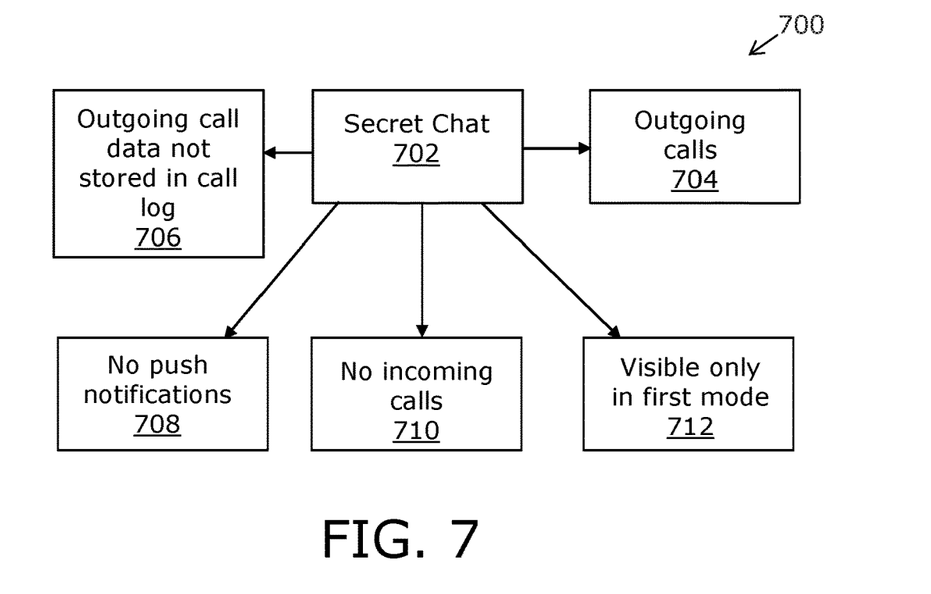
FIG. 7 is an illustration of features of a secret chat, in accordance with an embodiment of the present disclosure.

Referring to FIG. 7, illustrated are features 700 of a secret chat 702, in accordance with an embodiment of the present disclosure. As shown, in the secret mode of operation, a feature 704 shows that the messaging application supports outgoing calls to the secret contacts. Moreover, a feature 706 shows that the messaging application does not store any outgoing call data related to the outgoing calls to the secret contacts in the call log of the electronic communications device. Furthermore, a feature 708 shows that the messaging application allows no push notifications from the secret contacts. Moreover, a feature 710 shows that the messaging application allows no incoming calls from the secret contacts. Furthermore, a feature 712 shows that the secret contacts are only visible as contacts in the first mode of operation.

Figure 8:
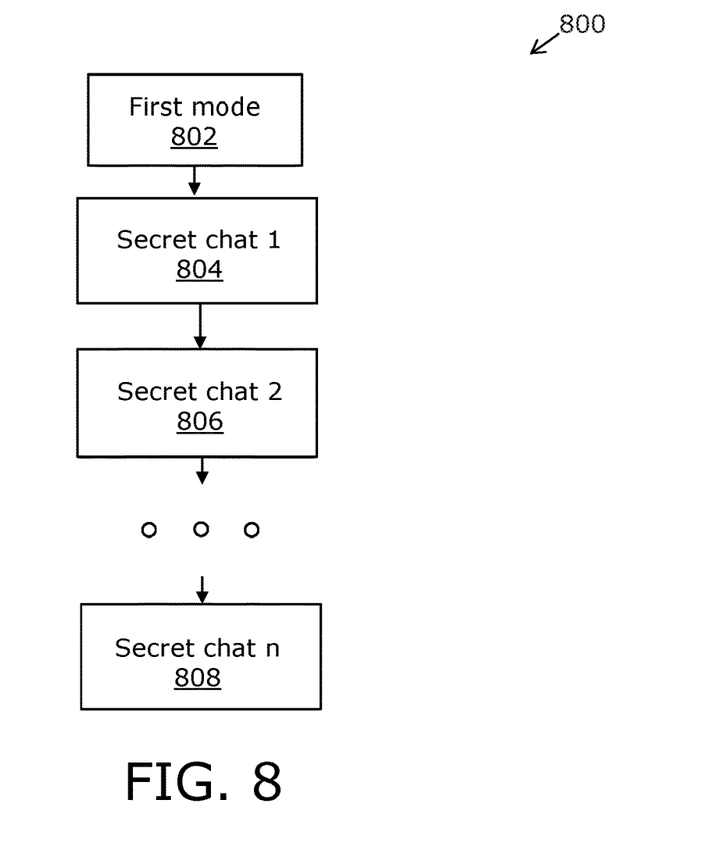
FIG. 8 is an illustration of hierarchy of a secret chat, in accordance with an embodiment of the present disclosure.

Referring to FIG. 8, illustrated is a secret chat hierarchy 800 in accordance with an embodiment of the present disclosure. As shown, the user is allowed to access the messaging application in the first mode 802, wherein all message data related to all the contacts are displayed in the messaging interface. Moreover, the user is allowed to create 'n' number of instances of the secret mode. In a first instance of secret mode 804, the user interface displays the message data related only to the contacts that are not designated as the secret contacts in the first mode. In a second instance of secret mode 806, the user is displayed the message data related only to the contacts that are not designated as the secret contacts in the first mode and the first instance of secret mode. Therefore, in an 'n' instance of secret mode 808, the user is displayed the message data related only to the contacts that are not designated as the secret contacts in the first mode and the first instance of secret mode to an (n−1) instance of secret mode.

A user may create more than one secret chat instance from within the first mode (or from in any given secret instance), with the effect that there are multiple parallel hierarchies.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A messaging application for a messaging service embodied in a memory of an electronic communications device including a data store, the messaging application, when executed by a processor of the electronic communications device, being configured to:
   provide a messaging interface on which outgoing messages from a user, having a registered identity on the messaging service, to one or more contacts can be composed and incoming messages from one or more contacts can be viewed;
   store message data in an encrypted form as a database file on the electronic communications device;
   require the user to input a predetermined access code before giving access to the messaging interface; and
   provide two modes of operation:
      a first mode in which the user is given access to all the message data that are stored on the electronic communications device for the registered identity of the user, wherein the first mode of operation is entered in the event that a first predetermined access code is provided to obtain access to the messaging interface, and
      a second, secret mode in which the user is given access to only a subset of all the message data that are stored on the electronic communications device for the registered identity of the user, wherein the secret mode of operation is entered in the event that one of a group of second predetermined access codes is provided to obtain access to the messaging interface wherein the messaging application is configured to require the user to input the predetermined access code before giving the user access to the stored message data; and to delete the database file containing the encrypted data in an event that a predetermined access code other than the first predetermined access code or the second predetermined access code is provided in place of the predetermined access code,
   and wherein the messaging application is further configured, in the event that a given predetermined code other than the first predetermined access code or the second predetermined access code is provided in place of the predetermined access code, to send a communication to a server administering the messaging service to unregister the registered identity from the messaging service so that the messaging service will subsequently not transmit notifications of incoming calls or messages made to that registered identity.

2. The messaging application as claimed in claim 1, wherein the messaging application provides an option enabling the user to designate any one of the one or more contacts as a secret contact, with the effect that no push notifications of the messages are displayed for any contact designated as a secret contact.

3. The messaging application as claimed in claim 2, wherein the messaging application supports incoming calls from the one or more contacts, and designating one of the one or more contacts as a secret contact has the effect that no incoming calls are supported for any contact designated as a secret contact.

4. The messaging application as claimed in claim 3, wherein the messaging application supports outgoing calls to the contacts designated as secret contacts, but withholds call details of such outgoing calls from any call log feature of an operating system of the electronic communications device, so that such outgoing calls do not appear in any call log on the electronic communications device.

5. The messaging application as claimed in claim 4, wherein any given instance of the secret mode provides the user with access to messages exchanged with contacts, other than secret contacts, in the instance of the secret mode or the first mode in which the given instance was created.

6. The messaging application as claimed in claim 1, wherein the group of second predetermined access codes consists of a single access code.

7. The messaging application as claimed in claim 1, wherein the messaging application supports multiple instances of the secret mode, each invoked with its own predetermined access code from the group of second predetermined access codes.

8. The messaging application as claimed in claim 1, wherein the messaging application is configured to provide an option for the user to create another instance of the secret mode, with its own predetermined access code, from within either the first mode or an instance of the secret mode.

9. The messaging application as claimed in claim 8, wherein the first mode and all the instances of the secret mode form a hierarchy with the first mode at the head of the hierarchy.

10. The messaging application as claimed in claim 9, wherein each particular instance of the secret mode provides the user with access to messages exchanged with contacts, other than secret contacts, in the first mode and all instances of the secret mode between the particular instance of the secret mode and the first mode in the hierarchy.

11. The messaging application as claimed in claim 1, wherein the messaging application is configured in the first mode to provide the user with access to all messages exchanged with all contacts in both the first mode and all instances of the secret mode.

12. The messaging application as claimed in claim 1, wherein the messaging application is configured to accept the predetermined access codes in a form of gestures captured by an image capture module of the electronic communications device, or patterns of touch captured by a touch-sensitive interface of the electronic communications device.

13. An electronic communications device including a data store and a processor, the electronic communications device having a messaging application for a messaging service, the processor being configured to execute the messaging application to:
   provide a messaging interface on which outgoing messages from a user, having a registered identity on the messaging service, to one or more contacts can be composed and incoming messages from one or more contacts can be viewed;
   store message data in an encrypted form as a database file in the data store on the electronic communications device;
   require the user to input a predetermined access code before giving access to the messaging interface; and
   provide two modes of operation:
      a first mode, in which the user is given access to all the message data that are stored on the electronic communications device for the registered identity of the user, wherein the first mode of operation is entered in the event that a first predetermined access code is provided to obtain access to the messaging interface; and
      a second, secret mode in which the user is given access to only a subset of all the message data that are stored on the electronic communications device for registered identity of the user, wherein the second mode of operation is entered in the event that one of a group of second predetermined access codes is provided to obtain access to the messaging interface
   wherein when executing the messaging application, the processor is configured to require the user to input a predetermined access code before giving the user access to the stored message data; and to delete the database file containing the encrypted data in an event that a third predetermined access code other than the first predetermined access code or the second predetermined access code is provided in place of the predetermined access code,
   and wherein when executing the messaging application, the processor is configured, in the event that a given predetermined code other than the first predetermined access code or the second predetermined access code is provided in place of the predetermined access code, to send a communication to a server administering the messaging service to unregister the registered identity from the messaging service so that the messaging service will subsequently not transmit notifications of incoming calls or messages made to that registered identity.

14. The electronic communications device as claimed in claim 13, wherein when executing the messaging application, the processor is configured to provide an option to enable the user to designate any one of the one or more contacts as a secret contact, with the effect that no push notifications of messages are displayed, and no incoming calls supported, for any contact designated as a secret contact.

15. The electronic communications device as claimed in claim 14, wherein the messaging application supports incoming calls from the one or more contacts, and designating one of the one or more contacts as a secret contact has the effect that when executing the messaging application, the processor is configured not to support incoming calls for any contact designated as a secret contact.

16. The electronic communications device as claimed in claim 15, wherein when executing the messaging application, the processor is configured to support outgoing calls to contacts designated as a secret contact, but to withhold call details of any outgoing calls to contacts designated as a secret contact from any call log feature of an operating system of the electronic communications device so that such outgoing calls do not appear in any call log on the electronic communications device.

17. The electronic communications device as claimed in claim 16, wherein when executing the messaging application, the processor is configured, in any given instance of the secret mode, to provide the user with access to messages exchanged with contacts, other than the secret contacts, in the instance of the secret mode or the first mode in which the given instance was created.

18. The electronic communications device as claimed in claim 13, wherein when executing the messaging application, the processor is configured to support multiple instances of the secret mode, each invoked with its own predetermined access code from the group of second predetermined access codes.

19. The electronic communications device as claimed in claim 13, wherein when executing the messaging application, the processor is configured to provide an option for the user to create another instance of the secret mode, with its own predetermined access code, from within either the first mode or an instance of the secret mode.

20. The electronic communications device as claimed in claim 19, wherein the first mode and all the instances of the secret mode form a hierarchy with the first mode at the head of the hierarchy.

21. The electronic communications device as claimed in claim 20, wherein when executing the messaging application, the processor is configured in each particular instance of the secret mode to provide the user with access to messages exchanged with contacts, other than the secret contacts, in the first mode and all instances of the secret mode between the particular instance of the secret mode and the first mode in the hierarchy.

22. The electronic communications device as claimed in claim 13, wherein when executing the messaging application, the processor is configured in the first mode to provide the user with access to all messages exchanged with all contacts in both the first mode and all instances of the secret mode.

23. The electronic communications device as claimed in claim 13, wherein the messaging application is configured to accept the predetermined access codes in a form of gestures captured by an image capture module of the electronic communications device, or patterns of touch captured by a touch-sensitive interface of the electronic communications device.

* * * * *